US006952300B2

(12) United States Patent  
Levy

(10) Patent No.: US 6,952,300 B2
(45) Date of Patent: Oct. 4, 2005

(54) MAGNETO-PHOTONIC CRYSTAL ISOLATORS

(75) Inventor: Miguel Levy, Chassell, MI (US)

(73) Assignee: Board of Control of Michigan Technological University, Houghton, MI (US)

( * ) Notice: Subject to any disclaimer, the term of this patent is extended or adjusted under 35 U.S.C. 154(b) by 0 days.

(21) Appl. No.: 10/469,436

(22) PCT Filed: Feb. 27, 2002

(86) PCT No.: PCT/US02/05921

§ 371 (c)(1),
(2), (4) Date: Aug. 28, 2003

(87) PCT Pub. No.: WO02/069029

PCT Pub. Date: Sep. 6, 2002

(65) Prior Publication Data

US 2004/0080805 A1 Apr. 29, 2004

Related U.S. Application Data

(60) Provisional application No. 60/272,100, filed on Feb. 28, 2001.

(51) Int. Cl.[7] .............................. G02F 1/09; G02F 1/00; G02F 1/295
(52) U.S. Cl. .............................. 359/280; 359/324; 385/6
(58) Field of Search ................................. 359/280–282, 359/237–240, 324, 484; 369/13.1; 385/6

(56) References Cited

U.S. PATENT DOCUMENTS

| | | |
|---|---|---|
| 4,375,910 A | 3/1983 | Seki |
| 4,806,885 A | 2/1989 | Morimoto |
| 4,932,760 A | 6/1990 | Arii et al. |
| 4,974,944 A | 12/1990 | Chang |
| 4,981,341 A | 1/1991 | Brandle, Jr. et al. |
| 4,995,696 A | 2/1991 | Nishimura et al. |
| 5,031,983 A | 7/1991 | Dillon, Jr. et al. |
| 5,040,863 A | 8/1991 | Kawakami et al. |
| 5,146,361 A | 9/1992 | Licht |
| 5,151,955 A | 9/1992 | Ohta et al. |
| 5,237,445 A | 8/1993 | Kuzuta |
| 5,408,354 A | 4/1995 | Hosokawa |
| 5,446,578 A | 8/1995 | Chang et al. |
| 5,479,290 A | 12/1995 | Tanno et al. |
| 5,774,264 A | 6/1998 | Konno et al. |
| 5,785,752 A | 7/1998 | Tanno et al. |
| 5,808,793 A | 9/1998 | Chang et al. |
| 6,075,642 A | 6/2000 | Chang |
| 6,262,949 B1 | 7/2001 | Inoue et al. |
| 6,545,795 B2 | 4/2003 | Matsushita et al. |
| 2002/0018913 A1 | 2/2002 | Kato et al. |
| 2002/0063941 A1 | 5/2002 | Matsushita et al. |

OTHER PUBLICATIONS

M. Inoue, et al., "Magneto–Optical Properties of One–Dimensional Photonic Crystals Composed of Magnetic and Dielectric Layers," J. Appl. Phys. 83, No. 11, 6768–6770, Jun. 1998.

M. Inoue, et al., "A Theoretical Analysis of Magneto–Optical Faraday Effect of YIG Films with Random Multilayer Structures," J. Appl. Phys. 81, No. 8, 5659–5661, Apr. 1997.

M. Inoue, et al., "One–Dimensional Magnetophotonic Crystals," J. Appl. Phys. 85, No. 8, 5768–5770, Apr. 1999.

(Continued)

Primary Examiner—Loha Ben
Assistant Examiner—Jack Dinh
(74) Attorney, Agent, or Firm—Michael Best & Friedrich LLP

(57) ABSTRACT

A magneto-optical isolator (20) for an optical circuit. The isolator includes a substrate, and an optical channel (350) disposed next to the substrate. The optical channel and substrate are configured to transmit optical radiation within the optical channel. The isolator further includes a photonic-crystal rotator (24) formed with the substrate and the optical channel. The rotator has at least one defect (52) and magnetic (M) and non-magnetic (N) materials.

17 Claims, 7 Drawing Sheets

OTHER PUBLICATIONS

E. Takeda, et al., "Faraday Effect Enhancement in Co–Ferrite Layer Incorporated Into One–Dimensional Photonic Crystal Working as a Fabry–Perot Resonator," J. Appl. Phys. 87, No. 9, 6782–6784, May 2000.

S. Sakaguchi, et al., "Transmission Properties of Multilayer Films Composed of Magneto–Optical and Dielectric Materials," IEEE J. Lightwave Technol., 17, No. 6, 1087–1999, Jun. 1999.

M. J. Steel, et al., "High Transmission Enhanced Faraday Rotation in One–Dimensional Photonic Crystals with Defects," IEEE Photonics Technol. Lett. 12, No. 9, 1171–1173, Sep. 2000.

M. J. Steel, et al., "Large Magneto–Optical Kerr Rotation with High Reflectivity from Photonic Band Gap Structures with Defects," IEEE J. Lightwave Technol. 18, No. 9, 1289–1296, Sep. 2000.

M. J. Steel, et al., "Photonic Band Gaps with Defects and the Enhancement of Faraday Rotation," IEEE J. Lightwave Technol. 18, No. 9, 1297–1308, Sep. 2000.

Toshihiro Shintaku, et al., "Magneto–Optic Channel Waveguides in Ce–Substituted Yttrium Iron Garnet," J. Appl. Phys. 74, No. 8, 4877–4881, Oct. 1993.

Wei Li, et al., "Phase–Shifted Bragg Grating Filters with Symmetrical Structures," IEEE J. Lightwave Technol. 15, 1405–1409, Aug. 1997.

M. Levy, et al., "Flat Top Response in One–Dimensional Magnetic Photonic Band Gap Structures with Faraday Rotation Enhancement," IEEE J. Lightwave Technol. 19, 1964–1969 (2001).

MAGNETO-PHOTONIC CRYSTAL ISOLATORS

RELATED APPLICATIONS

This patent application claims the benefit of U.S. Provisional Patent Application No. 60/272,100, entitled "MAGNETO-PHOTONIC CRYSTAL ISOLATORS", filed on Feb. 28, 2001, the entire contents of which is incorporated herein by reference.

STATEMENT REGARDING FEDERALLY SPONSORED RESEARCH FOR DEVELOPMENT

This invention was made with United States government support under National Science Foundation awarded by the PHS grant number ECS 0115315. The United States government has certain rights in this invention.

BACKGROUND OF THE INVENTION

The present invention relates to photonic band-gap materials.

In many applications of lasers or other radiation sources, it is important to prevent reflected radiation from interacting with the source. Reflected radiation generates undesirable noise and unwanted feedback. Photonic or optical circuits is just one example of an application where there exists a need to isolate a source from reflected radiation.

As is known in the art, the Faraday effect in magneto-optical materials rotates the polarization of an incident beam as it passes through the material. Because of their Faraday effect, magneto-optical materials are used in non-reciprocal devices to serve as an isolator, i.e., a device that permits the transmission of light in only one direction. By placing an isolator near the radiation source in the path of propagating light, the isolator allows the emitted light to pass through. Any reflected light from the optical circuit is not permitted to pass through the isolator. Instead, the isolator blocks-out the reflected light, preventing the light from interacting with the source. However, traditional isolators are large, prohibiting them to be fabricated on an optical chip. A smaller isolator capable of being formed on an optical chip and produce a large Faraday rotation is thus desirable.

SUMMARY OF THE INVENTION

The invention provides a rotator formed from a photonic crystal capable of producing an enhanced Faraday rotation on an incident light beam. Photonic crystals, also referred to as photonic band-gap ("PBG") materials, are dielectric structures in which the refractive index changes periodically, creating a band gap at optical frequencies. The band gap forbids the propagation of a certain frequency range of light through the material. By introducing defects or resonant cavities in the PBG material, light can be localized or trapped in the defect. The material structure can be tuned to manipulate the light such that the material will induce resonant tunneling or the transmission of light.

In one embodiment, the invention provides a magneto-optical isolator for an optical circuit. The isolator includes first and second polarizers, and a photonic-crystal rotator. The rotator has at least one defect in the rotator and is positioned between the first and second polarizers. The rotator includes a magnetic material.

In another embodiment, the isolator includes a substrate, and an optical channel disposed next to the substrate. The optical channel and substrate are configured to transmit optical radiation within the optical channel. The optical channel includes a photonic-crystal rotator. The rotator has at least one defect and includes a magnetic material.

In yet another embodiment, the invention provides a photonic-crystal rotator for an optical isolator. The rotator includes a substrate and an optical channel disposed next to the substrate. The optical channel and substrate are configured to transmit optical radiation within the optical channel. The optical channel includes a magneto-photonic band-gap material having a defect.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
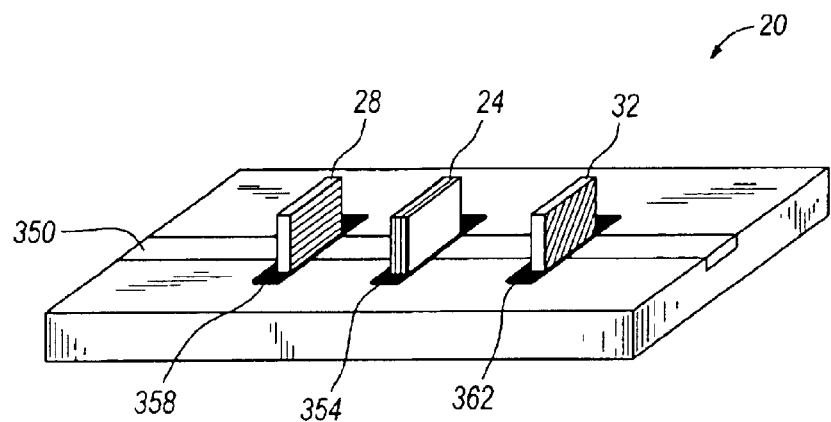
FIG. 1 is a perspective view of an isolator embodying the invention.

A magneto-optical isolator 20 embodying the invention is illustrated in FIG. 1. The isolator 20 includes a thin-film photonic-crystal stack or rotator 24 found in between a first film polarizer 28 and a second film polarizer 32. As shown in FIG. 1, the rotator 24 and the polarizers 28 and 32 are three separate elements. In other embodiments, the rotator 24 and the polarizers 28 and 32 form a single element. An example polarizer 28 or 32 is a commercially fabricated film polarizer that is sold under the brand name Lamipol.

Figure 2:
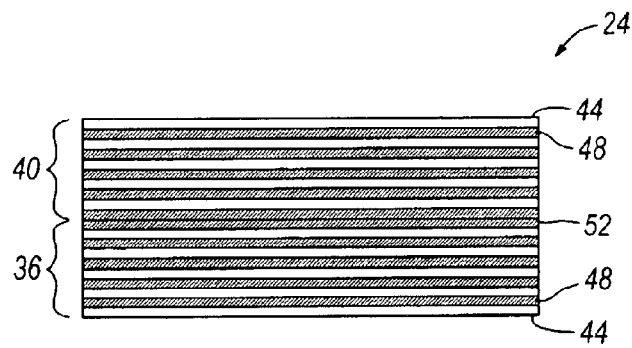
FIG. 2 is a schematic diagram of an exemplary rotator included in the isolator shown in FIG. 1.

The rotator 24 includes periodic stacks of alternating magnetic and non-magnetic thin-film layers. As shown in FIG. 2, the exemplary rotator 24 includes a first stack 36 of thin-film layers and a second stack 40 of thin-film layers. The first stack 36 alternates non-magnetic layers 44 with magnetic layers 48, while the second stack 40 alternates magnetic layers 48 with non-magnetic layers 44. The non-magnetic layers 44 have a first index of refraction, $n_n$, while the magnetic layers 48 have a second index of refraction, $n_m$, that differs from the first index of refraction. The magnetic layers 48 are formed from magnetic-garnet materials such as yttrium iron garnet ("YIG"), bismuth-substituted YIG ("Bi:YIG"), bismuth-substituted dysprosium iron garnet ("Bi:DyIG"), cerium-substituted YIG ("Ce:YIG"), ytterbium iron garnet ("YbIG"), bismuth-substituted YbIG ("Bi:YbIG"), or other various rare-earth iron garnets. These magnetic layers 48 have non-reciprocal properties, low losses, and large Faraday rotation in the near infrared region of the optical spectrum. However, other magnetic materials may be used with the invention. The magnetic material yields a larger Faraday rotation with a higher bismuth or other various rare-earth iron garnets content. The non-magnetic layers 44 are formed from materials such as gadolinium gallium garnet ("GGG"), silicon dioxide ("SiO$_2$"), tantalum oxide ("Ta$_2$O$_5$"), dysprosium gallium garnet ("DyGG"), neodymium gallium garnet ("NdGG"), or other non-magnetic dielectric materials. The magnetization of the magnetic layers 48 is oriented preferentially normal to the plane of the film.

The stacks 36 and 40 are configured such that when the first stack 36 is positioned next to the second stack 40, a magnetic layer 48 from the first stack 36 is positioned next to a magnetic layer 48 from the second stack 40. This configuration causes a variation in the periodicity of the rotator 24. Two layers of the same material positioned next to each other without having a layer of differing material between them is referred to as a phase shift or a defect in the rotator. In other words, defects are introduced by varying or breaking the periodicity of the crystal. Varying the periodicity of the crystal may be accomplished by adding or removing one or more layers, or varying the length of one or more layers. As will be discussed below, the layers 44 and 48 can be manufactured using liquid phase epitaxy or radio frequency sputtering techniques. However, other manufacturing techniques are possible.

Figure 3:
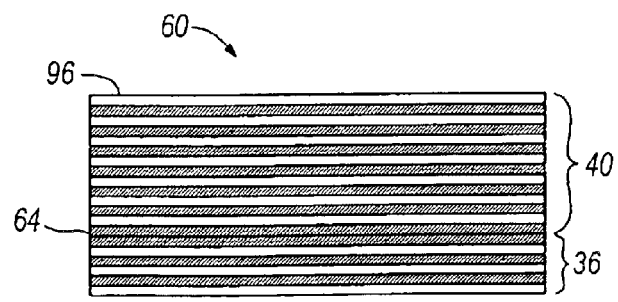
FIG. 3 is a schematic diagram of another exemplary rotator included in the isolator shown in FIG. 1.

As shown in FIG. 2, the rotator 24 has a single defect 52 positioned at the center of the rotator 24, and is referred to as a symmetric magneto-photonic rotator. As shown in FIG. 3, the rotator 60 also has a single defect 64, however the defect 64 is not positioned near the center. Rotator 60 is referred to as an asymmetric rotator.

Figure 4:
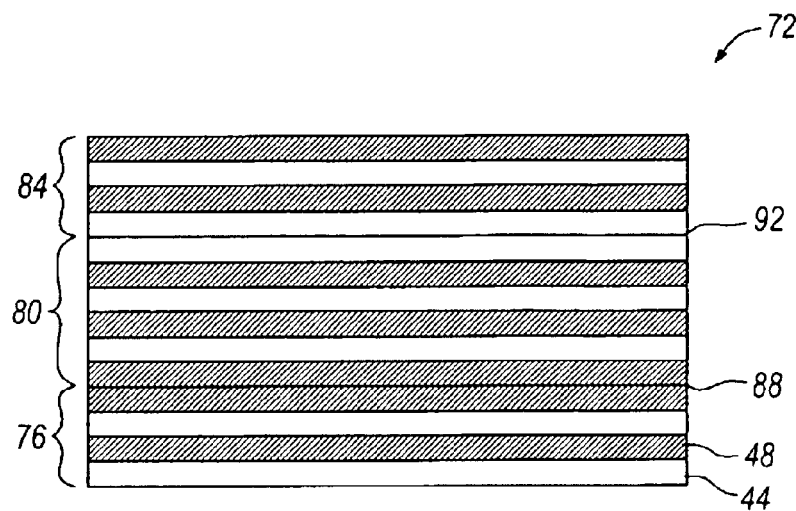
FIG. 4 is a schematic diagram of yet another exemplary rotator included in the isolator shown in FIG. 1.

In some embodiments, the rotator 24 includes any number of stacks, resulting in numerous defects. As shown in FIGS. 2 and 3, the rotators 24 and 60 include two stacks each, and each rotator 24 and 60 can be expressed as the form of $(NM)^j(MN)^k$, where N represents a non-magnetic layer and M represents a magnetic layer. The $(NM)^j$ series represents the first stack 36 and the $(MN)^k$ series represents the second stack 40. The repetition factors j and k can vary independently, producing stacks of various lengths and symmetries, such as the symmetric rotator 24 or the asymmetric rotator 60. As shown in FIG. 4, the rotator 72 includes three stacks 76, 80 and 84 resulting in two defects 88 and 92. The rotator 72 takes the form $(NM)^j(MN)^k(NM)^j$, where the first $(NM)^j$ series represents the first stack 76, the $(MN)^k$ series represents the second stack 80, and the second $(NM)^j$ series represents the third stack 84. By increasing or decreasing j and k, the position of the defects can vary and result in producing symmetric rotators, such as rotator 24 or 72.

As mentioned previously, the presence of a defect in the rotator 24, 60, or 72 introduces transmission resonances in the band gap that are associated with the trapped states of light. Also, patterning the rotator 24, 60, or 72 with alternating layers 44 and 48 of varying refraction indices produces a longer mean optical path length than in a uniform medium or material of the same length. As used herein, the term "optical path length" is the product of the geometrical distance of the layer and the refractive index. Therefore, the light tuned at or near the resonance in the band gap is largely transmitted. Yet, light trapped in the periodic rotator 24, 60, or 72 has a larger optical path length to overcome. In the periodic rotator 24, 60, or 72, the circular birefringence effects the light over a longer mean optical path length, which in turn produces larger phase differences between the two circularly polarized beams. As used herein, the term "circular birefringence" is the separation of a light beam into two beams with opposite circular polarization, i.e. left-hand circularly polarized and right-hand circularly polarized. Half of the phase difference between right-hand and left-hand circular polarization determines the Faraday rotation of the structure. Thus, a larger phase difference produces an enhanced rotation. In other words, the periodic rotator 24, 60, or 72, which produces a large optical path length over a relatively small geometric distance, yields a large enhanced rotation in the light beam while decreasing the physical length of the rotator 24, 60, or 72.

A rotator that has only a single, central defect 52, such as rotator 24, is able to produce enhanced rotation in the light (due to the increase mean optical path length created by the layers 44 and 48), but is accompanied with decreased transmission. Having the rotator 24 operate as a reflector produces the same rotational enhancement with the same decreased results for reflection. Moving the single defect towards the front of the rotator, as shown in FIG. 3 with the rotator 60, and place corrugation gratings near the rear 96 of the rotator 60, the rear grating 96 of the rotator 60 turns into an almost essentially perfect reflector. In rotators of the form $(NM)^j(MN)^k$, such as rotator 60, the rear grating 96 enforces reflection when j is less than k.

Figure 5:
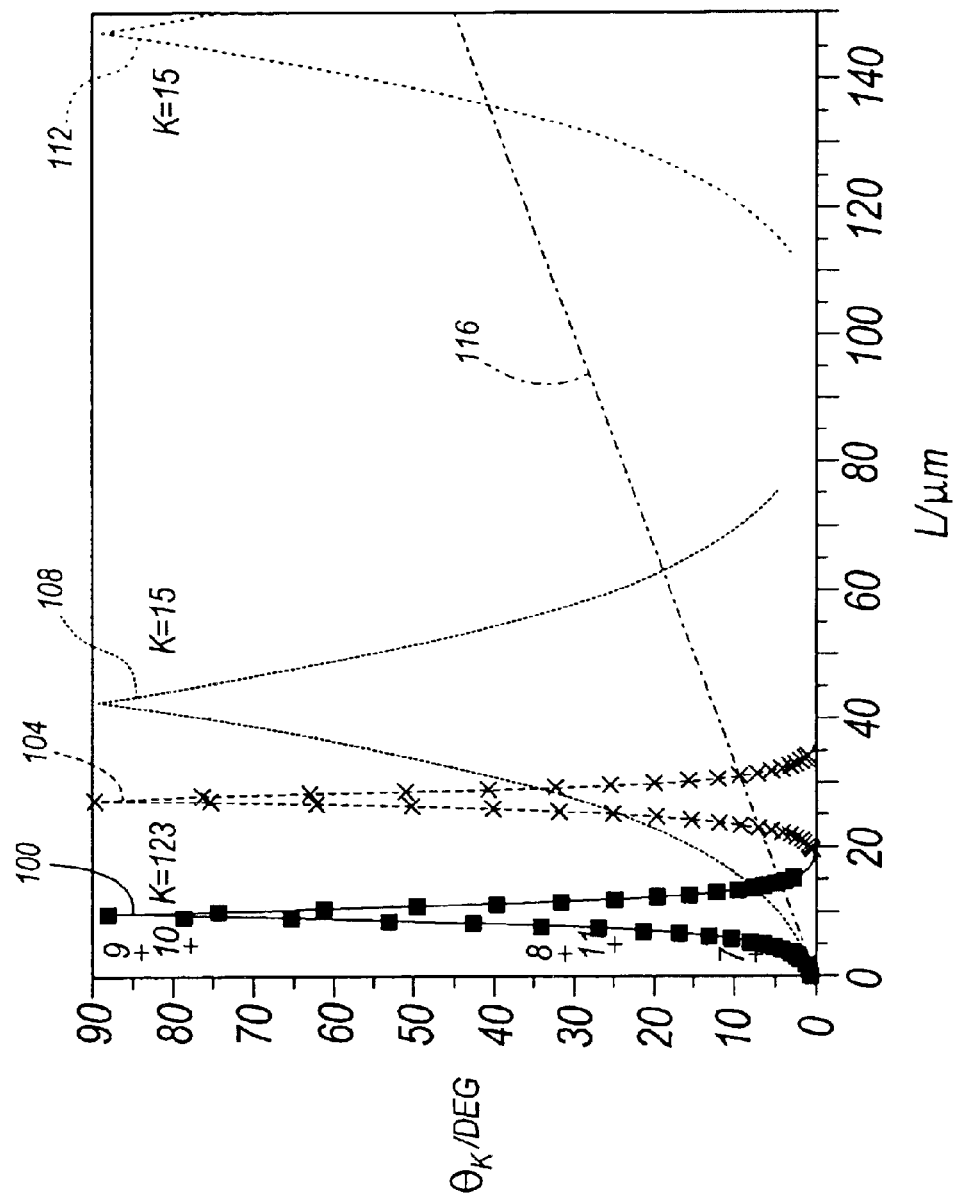
FIG. 5 illustrates the Faraday rotation in different rotators or stacks, which have a single defect and are operating in reflection.

FIG. 5 shows the Faraday rotation in different rotators or stacks, which have a single defect and are operating in reflection, as a function of length. For FIG. 5, L is the length of the magnetic part of the stack. This is the total length of the stack when the rear grating is also magnetic. L becomes slightly smaller when the rear grating of the stack is not magnetic. Solid line 100 corresponds to a periodic stack of Bi:YIG/GGG (Bi:YIG as the magnetic layer and GGG as the non-magnetic layer) with high refractive index contrast after the single defect. The stack represented by the solid line 100 has a grating coupling strength, κ, of 123. Dashed line 104 also corresponds to a periodic stack of Bi:YIG/GGG with a grating coupling strength, κ, of 123. However, the stack represented by the dashed line 104 has the same refractive index contrast on both sides of the defect. Fine dotted line 108 and coarse dotted line 112 correspond to corrugated slab waveguide of Bi:YIG material each with a single defect and having a grating coupling strength, κ, of 15. The slab represented by the fine dotted line 108 has a high refractive index contrast after the defect and the slab represented by the coarse dotted line 112 has a low refractive index contrast after the defect. As illustrated in FIG. 5, the periodic stacks of Bi:YIG/GGG represented by solid line 100 and dashed line 104 produce a Faraday rotation close to 90°, while reducing the length of the stacks to approximately less than 30 μm.

The trade-off between the Faraday rotation and the transmission of light, which is present in single defect structures, such as rotators 24 and 60, is reduced when using periodic stacks with two or more defects, such as rotator 72. The rotator 72 having two defects 88 and 92 is able to vary the location of one defect 88 or 92 or both defects 88 and 92, such that the rotator 72 induces the largest phase difference between the left-hand circularly polarized ("LHCP") light beam and the right-hand circularly polarized ("RHCP") light beam, while allowing both light beams to resonantly transmit through the rotator 72.

Each circularly polarized ("CP") light beam has a transmission resonance as a function of wave vector, k (the vector whose direction is the direction of propagation and whose magnitude is given by the wave number, $2\pi/\lambda$). However, these resonances are not harmonious for the two polarizations. Rather, each circular polarization exhibits one or two resonance peaks that vary depending upon the values of the repetition factors, j and k, in the rotator 72. The presence of the two defects allows one to adjust the resonance peak positions (by adjusting the values of j and k) until maximum transmission is achieved simultaneously for each polarization at any desired rotation. As stated previously, the rotator 72 is of the form $(NM)^j(MN)^k(NM)^j$. By varying the repetition factors j and k, adjustments are made to the positions of the defects 88 and 92 within the rotator 72 as well as the length of the rotator 72.

As shown in FIGS. 6, 7, 8, and 9, the transmission and phase of the LHCP beam and the RHCP beam are manipulated when the repetition factors, j and k, are varied in a two defect stack. FIGS. 6, 7, 8, and 9 also depicts the transmission and phase of circularly polarized light as a function of detuning the equation $$\delta k = 2\pi/(\lambda^{-1} - \lambda_0^{-1})$$

Detuning refers to the difference between the frequency (or wavelength) of the light beam and the resonant frequency (or resonant wavelength) of the rotator 72, where $\lambda_0^{-1}$ is the resonant frequency of the rotator 72, and $\lambda^{-1}$ is the frequency of the light beam. Furthermore, each two-defect rotator corresponding to FIGS. 6–9 include alternating layers of magnetic and non-magnetic material 48 and 44. Each layer 44 and 48 is approximately a quarter-wave plate, with a thickness of $$t_i = \lambda_0/4\sqrt{\epsilon_i}$$

where $\epsilon_i$ is the dielectric constant, i=M, N, and $\lambda_0$ is the resonant wavelength.

Figure 6:
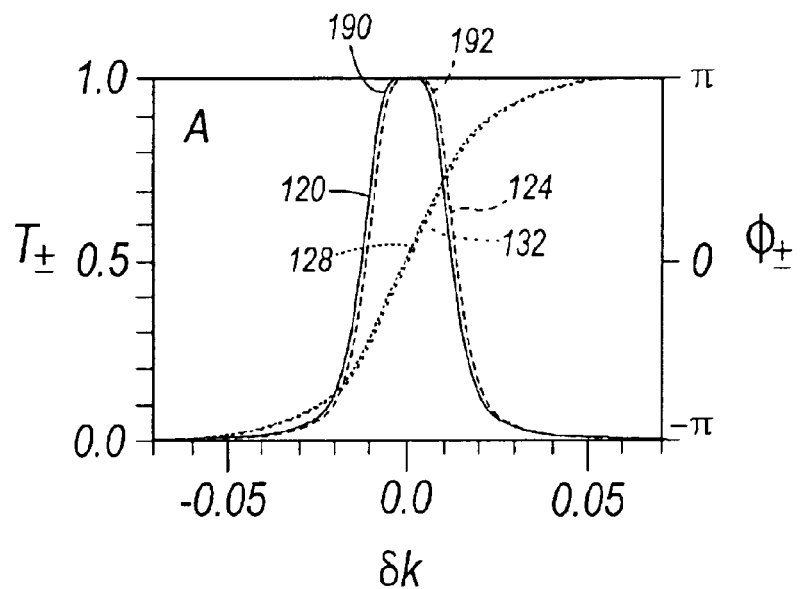
FIG. 6 illustrates the transmission and phase of circularly polarized light for an exemplary two-defect rotator embodying the invention.

FIG. 6 illustrates the phase and transmission functions of each CP beams in a two-defect rotator having the ratio of repetition factor, j, to repetition factor, k ("j/k"), be 0.5. Solid line 120 and dashed line 124 represent the transmissions of LHCP light and RHCP light, respectively. Fine dotted line 128 and coarse dotted line 132 represent the phases of LHCP light and RHCP light, respectively.

Figure 7:
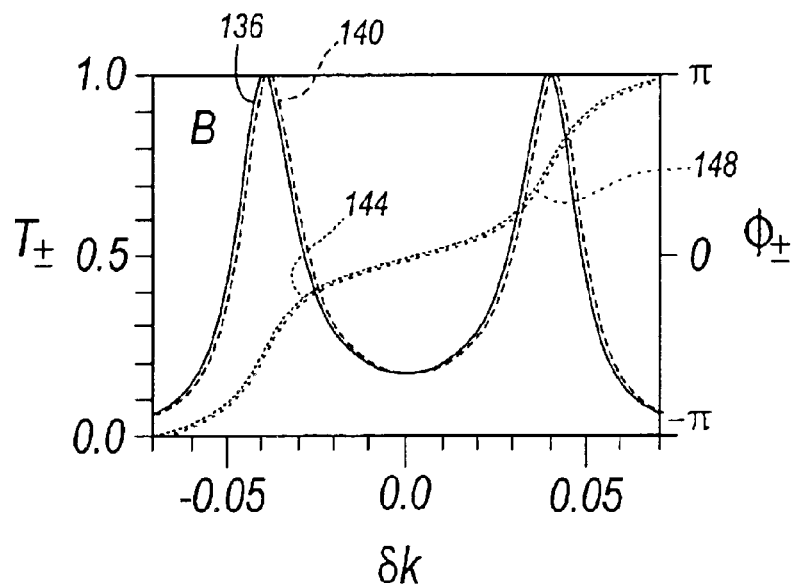
FIG. 7 illustrates the transmission and phase of circularly polarized light for another exemplary two-defect rotator.

FIG. 7 illustrates the phase and transmission functions of each CP beams in a two-defect rotator having the ratio of j/k be 1.0. Solid line 136 and dashed line 140 represent the transmissions of LHCP light and RHCP light, respectively. Fine dotted line 144 and coarse dotted line 148 represent the phases of LHCP light and RHCP light, respectively.

Figure 8:
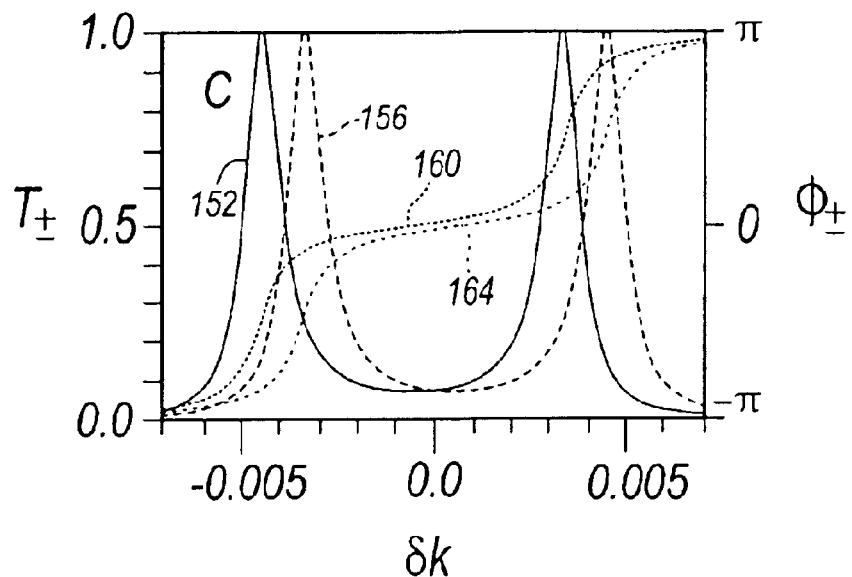
FIG. 8 illustrates the transmission and phase of circularly polarized light for yet another exemplary two-defect rotator.

FIG. 8 illustrates the phase and transmission functions of each CP beams in a two-defect rotator having the ratio of j/k be 0.77. Solid line 152 and dashed line 156 represent the transmissions of LHCP light and RHCP light, respectively. Fine dotted line 160 and coarse dotted line 164 represent the phases of LHCP light and RHCP light, respectively.

Figure 9:
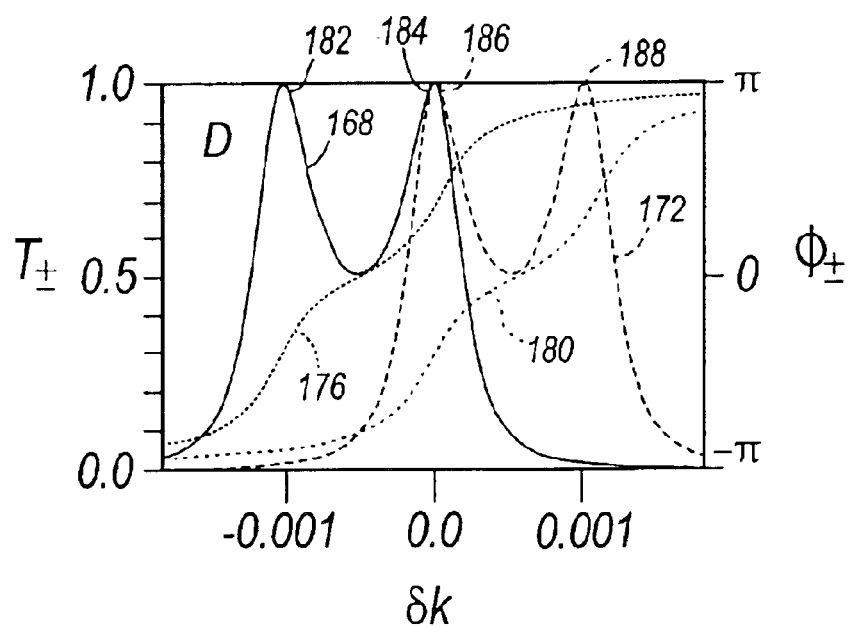
FIG. 9 illustrates the transmission and phase of circularly polarized light for even yet another exemplary two-defect rotator.

FIG. 9 illustrates the phase and transmission functions of each CP beams in an optimal two-defect rotator having the ratio of j/k be 0.58. Solid line 168 and dashed line 172 represent the transmissions of LHCP light and RHCP light, respectively. Fine dotted line 176 and coarse dotted line 180 represent the phases of LHCP light and RHCP light, respectively.

As shown in FIGS. 6, 7, 8, and 9, at the Bragg resonance, when $\delta k=0$, the transmission of both polarizations are approximately equal. However, the phase difference between each CP beam, and thus the Faraday rotation, is rather small for the rotators corresponding to FIGS. 6–8.

In the embodiment illustrated in FIG. 9, the rotator includes alternating layers of Bi:YIG and GGG with a resonant wavelength, $\lambda_0$, at approximately 1.55 μm. The rotator is approximately 37 μm and induces a Faraday rotation on the order of approximately 55°. When $SiO_2$ is substituted for GGG, a Faraday rotation of approximately 45° is achieved with a transmission rate of about 98%. However, the total length of the rotator is approximately 15.3 μm, with repetition factor j equaling 9 and repetition factor k equaling 17. This corresponds to a total of 35 pairs of layers, or 70 layers.

Also illustrated in FIG. 9, each peak 182, 184, 186, and 188 of the transmission lines 168, and 172, respectively, is relatively thin and corresponds to a small detuning number. As a result, the rotator represented in FIG. 9 only allows light beams that vary slightly in frequency from the resonant frequency of the rotator transmit at a high percentage. By manipulating the repetition factors, peaks 182 and 184 can form into a single peak, such as peak 190 in FIG. 6, and peaks 186 and 188 can form into another single peak, such as peak 192 in FIG. 6. Both peaks 190 and 192 are wider, and thus correspond to larger bandwidths for the rotator of FIG. 6. However, the difference in phase between the CP beams, illustrated as lines 128 and 132, is small, causing a small Faraday rotation.

Figure 10:
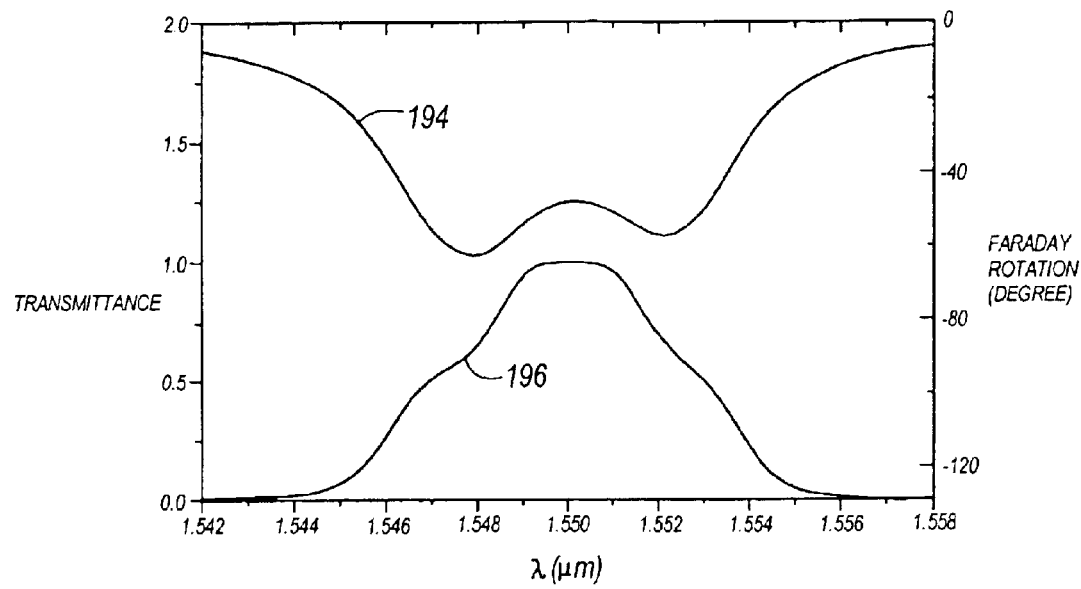
FIG. 10 illustrates the transmission and phase of circularly polarized light for an exemplary three-defect rotator.
Figure 11:
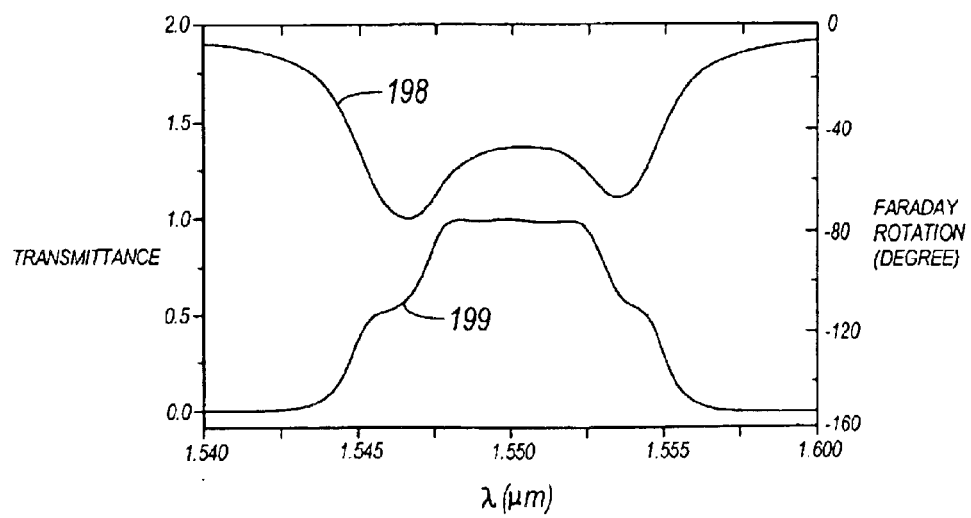
FIG. 11 illustrates the transmission and phase of circularly polarized light for an exemplary four-defect rotator.

However, with an introduction of a third or fourth defect in a rotator, the rotator is able to increase the Faraday rotation, while increasing the bandwidth near perfect transmission. FIGS. 10 and 11 illustrates transmission and Faraday rotation of a rotator with three defects and four defects, respectively. The rotator with three defects takes the form of $(NM)^j(MN)^k(NM)^k(MN)^j$, and the rotator with four defects takes the form of $(NM)^j(MN)^k(NM)^l(MN)^k(NM)^j$, where l is an additional repetition factor.

The rotator corresponding to FIG. 10 has the repetition factors of j equaling 13 and k equaling 28. The bandwidth, represented by solid line 194, for this rotator is approximately 2 nm for a Faraday rotation of approximately 45°. The Faraday rotation is represented by solid line 196. The rotator corresponding to FIG. 11 has the repetition factors of j equaling 12, k equaling 25, and l equaling 27. The bandwidth, represented by solid line 198, for the rotator with four defects is approximately 4 nm for a Faraday rotation of approximately 45°, as well. The Faraday rotation is represented by solid line 199.

In the embodiments shown, liquid-phase epitaxy ("LPE") or radio frequency ("RF") sputtering techniques are used to grow the thin film magnetic and non-magnetic layers 48 and 44, included in the rotators 24, 60, and 72, on garnet templates. Crystal ion slicing is used to remove layers 44 and 48 from their deposition template. Crystal ion slicing employs the formation and etching of a sacrificial layer in bulk, epitaxially grown or sputtered films. Deep ion implantation is used to generate a damage layer several microns beneath the bulk layer surface. The lattice damage in this layer induces a large etch selectivity relative to the rest of the material. This damage allows a thin layer to separate from the bulk. The etchant used for magnetic oxides is phosphoric acid.

To prepare the sample for crystal ion slicing, helium or hydrogen ions, energized up to 4 MeV, are implanted nearly normal to the ferrite surface without masking. Implantation dosages range from approximately $1 \times 10^{16}$ ions/cm$^{-2}$ to approximately $1 \times 10^{17}$ ions/cm$^{-2}$. The energy of the implantation can be adjusted to select the film thickness.

Helium or hydrogen is generally chosen as the implantation species because of their small atomic mass, thus yielding a deeply buried damage layer. Two dominant mechanisms for energy loss determine the implantation profile and the distribution of lattice damage in the crystal. At high ionic energies, the energy loss is dominated by electronic scattering. This process is adequately described by the Lindhard-Scharff-Schiott theory ("LSS theory"), which predicts a stopping power proportional to $E^{1/2}$. Here, E is the energy of the implanted ion along its trajectory. This process generates very little damage over most of the implant depth. At low energies, the stopping power is mostly due to Rutherford scattering with the host nuclei generating significant lattice damage. The nonlinear dependence on ionic energies ensures that the majority of the ions are deposited over a relatively narrow spatial region of the sample, where lattice defects are introduced by the transfer of energy to the target nuclei.

Figure 12:
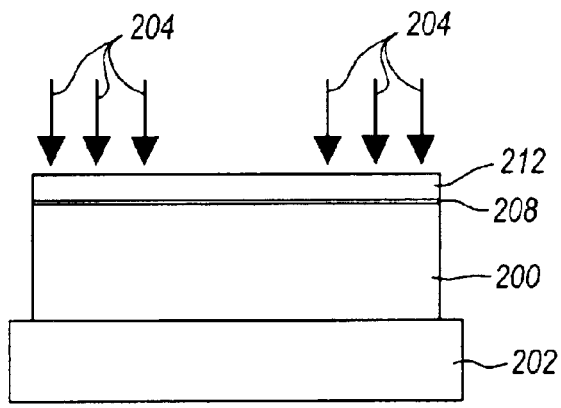
FIG. 12 is a schematic representation of a crystal being sliced by a crystal ion slicing method.
Figure 13:
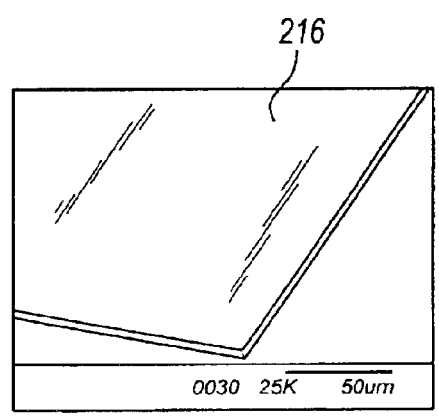
FIG. 13 is a perspective view of a film detached by the crystal ion slicing method.

A schematic representation of the crystal ion slicing is shown in FIG. 12, and an approximately 10 µm-thick YIG film detached in this manner is shown in FIG. 13. A bulk stack 200 of magnetic material, non-magnetic material, or both is grown on a deposition template 202, such as GGG or another substrate. The bulk stack 200 is implanted with helium or hydrogen ions 104. The ions 204 penetrate the bulk stack 200 creating a damaged layer 208. A thin layer 212 on top of the damaged layer 208 is able to be separated from the bulk stack 200. In the embodiment shown, the thin layer 212 is a single non-magnetic layer 44 or magnetic layer 48 (as shown in FIGS. 2–4). In other embodiments, the thin layer 212 is a stack of magnetic and non-magnetic layers, such as the stacks 36, 30, 76, 80, or 84 (as shown in FIGS. 3 and 4), or is the multiple layers and stacks that form the rotators 24, 60, or 72. A thin film 216 of YIG approximately 10 µm thick, shown in FIG. 13, has been detached from a bulk stack (not shown) using the crystal ion slicing process.

The rotator 24, 60, or 72 is then inserted into an optical channel 350 (shown in FIG. 1). For the embodiment shown, the rotator 24 is inserted into a narrow slot or opening 354 cut out in the channel 350 by reactive ion etching or chemically assisted ion beam etching. The first polarizer 28 is inserted into another slot 358 found on one side of the first slot 354, while the second polarizer 32 is inserted into a third slot 362 found on the other side of the first slot 354. A magnet or group of magnets are placed in close proximity to the rotator 24. The magnet has a magnetic field that interacts with the channel 350. In one embodiment, film magnets are placed on top of the channel 350, and in another embodiment, film magnets are placed on either side of the channel 350. The magnets saturate the magnetization along the rotator 24 and channel 350 in the direction parallel to a channel axis 1—1.

During operation, light emitted from a laser, a light emitting diode (LED), or another suitable source travels through the channel 350 and is incident on the first polarizer 28. The first polarizer 28 allows the emitted light having the same polarization as the first polarizer 28 to pass through. The emitted light is then incident of the rotator 24 and while it passes through, the rotator 24 rotates the polarization of the emitted light by approximately 45°. The emitted light is then incident on the second polarizer 32, which allows the emitted light that has been previously adjusted by the rotator 24 to transmit through. Any light that passes through the second polarizer 32 and is reflected by other components of an optical circuit then passes through the polarizer 32, and suffers another 45° rotation by the rotator 24. Therefore, the reflected light incident on the rotator 24 is not transmitted through the rotator 24, because its polarization direction is at 90° to the polarization axis of polarizer 28.

Figure 14:
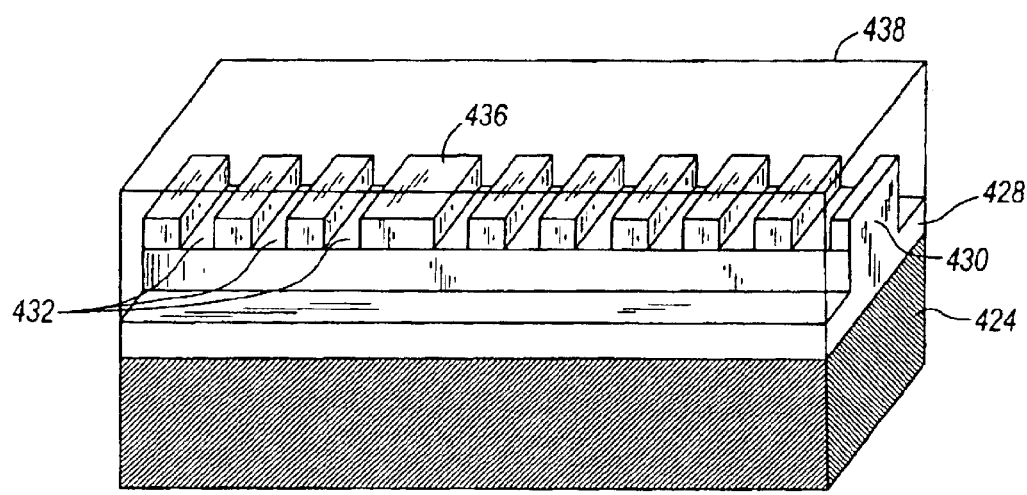
FIG. 14 is a perspective view of another embodiment of a rotator embodying the invention.
Figure 15:
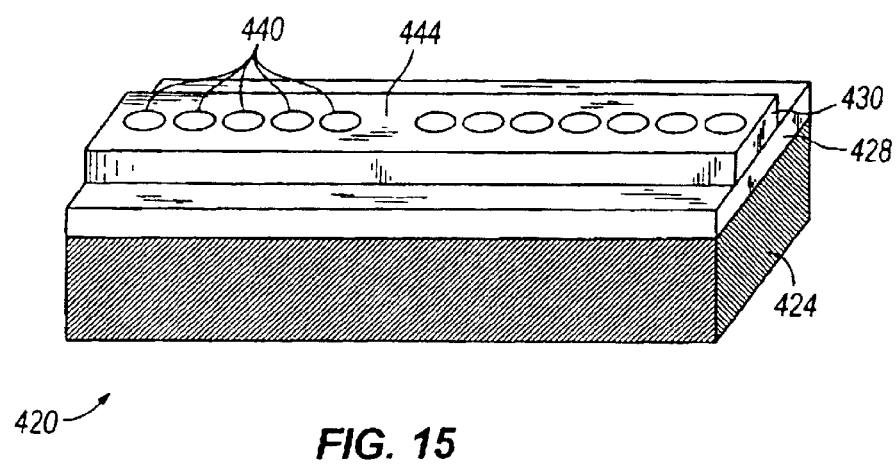
FIG. 15 is a perspective view of yet another embodiment of a rotator embodying the invention.

In another embodiment illustrated in FIGS. 14 and 15, a rotator 420 takes the form of an optical channel within a waveguide that is fabricated on an optical circuit chip. In FIG. 14, the rotator 420 includes a non-magnetic substrate 424. In the embodiment shown, the substrate 420 is fabricated from GGG material or other suitably lattice-matched garnet materials, such as dysprosium gallium garnet (DyGG). In other embodiments, the substrate 420 uses the same non-magnetic materials as the non-magnetic layers 44 found in the rotators 24, 60, and 72.

The rotator 420 also includes an optical channel 428 having a ridge 430 along axis 14—14. The optical channel 428 in the embodiment shown is formed from a magnetic garnet material, such as Bi:YIG. In other embodiments, the channel 428 is formed from the same magnetic materials as the magnetic layers 48 found in the rotators 24, 60, and 72. The channel 428 induces resonant tunneling of certain wavelengths of light by positioning a series of depressions on the ridge 430 of the channel 428. As shown in FIG. 14, the depressions are gratings or grooves 432 on the ridge 430. The gratings 432 change the refractive index of the channel 428 and generate a periodic modulation in the refractive index disposed to create a photonic band-gap structure in the film. In the embodiment shown, the gratings 432 are patterned on the ridge 430 that are approximately 200 nm long. Defects are created in the channel 428 by skipping a depression or widening a depression. In the embodiment shown, a defect 436 is created when a groove is skipped.

In order to avoid spurious linear birefringence due to lattice mismatch stress, the optical channel 428 or magnetic garnet layer is suitably LPE-grown or sputtered onto a lattice-matched substrate. Thus, for example, a YIG film on GGG or YbIG on DyGG. The magnetization in the YIG film is preferably parallel to the channel axis 14—14 to avoid linear magnetic birefringence.

In other embodiments, the rotator 420 further includes a cover 438 of non-magnetic material, such as GGG, to create a symmetric structure by using a cover layer with nearly the same index of refraction as the substrate 424 to avoid geometrical or waveguide linear birefringence. In the embodiment shown, the same material is used for the substrate 424 and the cover 438 in order to eliminate any refractive index asymmetries between the cover 438 and substrate 424.

In the embodiment shown in FIG. 15, the depressions found in the channel 428 take the form of holes 440. The channel 428 changes its refractive index by etching the holes 440 in the top of the ridge 430. These holes 440 are etched by reactive ion or chemically-assisted ion beam etching. Defects are created in this embodiment by leaving a larger gap, such as gap or defect 444, in between two holes 440. In other embodiments, the defects are produced by widening the holes or changing the shape and size of the holes. Also, in other embodiments, the rotator 420 includes multiple defects, rather than a single defect 436 or 444.

The rotator 420 is fabricated by liquid phase epitaxy or RF sputtering techniques to form and position the various layers. First, a layer of Bi:YIG or another suitable magnetic garnet is deposited over a non-magnetic substrate 424. As mentioned previously, in the embodiment shown, the substrate 424 is made from GGG or another suitably lattice-matched garnet material. The layer of Bi:YIG forms the optical channel 428. Using a phosphoric etch or similar etching technique, a ridge 430 is etched from the layer of Bi:YIG. In the embodiment shown, the ridge 430 is square in order to enhance the channel symmetry and minimize linear birefringence. In other embodiments, the ridge 430 is deposited as a layer on to the channel 428 using an RF sputtering technique. The gratings 432 or holes 440 are then patterned on the ridge 430 by electron-beam lithography, followed by reactive ion etching or chemically assisted ion beam etching. In the embodiment shown, the gratings 432 are approximately 200 nm. Once the gratings 432 or holes 440 have been patterned in the ridge 430, the cover 438 of non-magnetic material is sputtered over the channel 428.

In another embodiment, reactive dual ion beam sputtering ("RDIBS") is employed to produce Bi:YIG films on high-quality smooth thermally-grown $SiO_2$. RDIBS systems are used for the purpose of enhancing the refractive index contrast between film, substrate, and cover, then covered by smooth and dense RDIBS deposited $SiO_2$ layers with good optical properties. RDIBS allows the waveguide to shorten, since shorter planar photonic-crystal structures for optical isolation can be built. Thus, the gain is not only the reduction of size of the optical isolator devices, but the integration of the isolators onto silicon platforms.

Various features and advantages of the invention are set forth in the following claims.

What is claimed is:

1. A magneto-optical isolator for an optical circuit, the isolator comprising:
    a substrate; and
        an optical channel disposed next to the substrate, the optical channel and substrate being configured to transmit optical radiation within the optical channel, the optical channel including a photonic-crystal rotator, the rotator having at least one defect and including a magnetic material, and wherein the optical channel includes a series of depressions having a periodicity and wherein the defect includes a variation in the periodicity of the depressions.

2. An isolator as set forth in claim 1 wherein the isolator further comprises first and second polarizers.

3. An isolator as set forth in claim 1 and further comprising a magnet having a magnetic field, the magnet being positioned such that the field interacts with the rotator.

4. An isolator as set forth in claim 1 wherein the substrate, the optical channel, and the rotator form a monolithic photonic device.

5. An isolator as set forth in claim 1 wherein the optical channel is a magnetic material.

6. An isolator as set forth in claim 5 wherein the magnetic material is selected from the group consisting of yttrium iron garnet (YIG), bismuth-substituted YIG, bismuth-substituted dysprosium iron garnet, and cerium-substituted YIG.

7. A photonic-crystal rotator for an optical isolator, the rotator comprising:
    a substrate; and
    an optical channel disposed next to the substrate, the optical channel and substrate being configured to transmit optical radiation within the optical channel, the optical channel including a magneto-photonic bandgap material having a defect;
    wherein the optical channel has an axis,
    wherein the optical channel includes a series of depressions along the axis, the series of depressions having a periodicity, and
    wherein the defect includes a variation in the periodicity of the depressions.

8. A rotator as set forth in claim 7 wherein the variation in the periodicity is a lack of at least one depression.

9. A rotator as set forth in claim 7 wherein the depressions are holes within the optical channel.

10. A rotator as set forth in claim 9 wherein the variation in the periodicity is a lack of at least one hole.

11. A rotator as set forth in claim 7 wherein the optical channel includes a series of grates along the axis,
    wherein the depressions are formed by the grates.

12. A photonic-crystal rotator for an optical isolator, the rotator comprising:
    a substrate; and
    an optical channel disposed next to the substrate, the optical channel and substrate being configured to transmit optical radiation within the optical channel, the optical channel including a magneto-photonic bandgap material having a defect, wherein the optical channel has an axis,
    wherein the optical channel includes a series of grates along the axis, the series of grates having a periodicity, and
    wherein the defect includes a variation in the periodicity of the grates.

13. A rotator as set forth in claim 12 wherein each grate has a length in the direction of the axis, and
    wherein the variation in the periodicity is a variation in the length of at least one of the grates.

14. A photonic-crystal rotator for an optical isolator, the rotator comprising:
    a substrate; and
    an optical channel disposed next to the substrate, the optical channel and substrate being configured to transmit optical radiation within the optical channel, the optical channel including a magneto-photonic bandgap material having a defect, wherein the optical channel has an axis,
    wherein the optical channel includes a slab and a ridge disposed on the slab, the ridge being in a direction of the axis,
    wherein the ridge includes a series of depressions along the axis, the series of depressions having a periodicity, and
    wherein the defect includes a variation in the periodicity of the depressions.

15. A rotator as set forth in claim 14 wherein the slab and the ridge are unitary.

16. A photonic-crystal rotator for an optical isolator, the rotator comprising:
    a substrate; and
    an optical channel disposed next to the substrate, the optical channel and substrate being configured to transmit optical radiation within the optical channel, the optical channel including a magneto-photonic bandgap material having a defect, wherein the optical channel has an axis, wherein the optical channel includes a slab and a ridge disposed on the slab, the ridge being in a direction of the axis, wherein the optical channel further includes a series of grates disposed on the ridge along the axis, the series of grate having a periodicity, and wherein the defect includes a variation in the periodicity of the grates.

17. A rotator as set forth in claim 16 wherein the slab, the ridge, and the grates are unitary.

\* \* \* \* \*